US012763918B2

United States Patent
Li et al.

(12) United States Patent
(10) Patent No.: US 12,763,918 B2
(45) Date of Patent: Oct. 13, 2026

(54) METHODS AND APPARATUSES FOR A PHYSICAL UPLINK SHARED CHANNEL (PUSCH) REPETITION ENHANCEMENT MECHANISM FOR A TIME DIVISION DUPLEX (TDD) SCENARIO

(71) Applicant: Lenovo (Beijing) Limited, Beijing (CN)

(72) Inventors: Yingying Li, Beijing (CN); Zhi Yan, Beijing (CN); Hongmei Liu, Beijing (CN); Yuantao Zhang, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 321 days.

(21) Appl. No.: 18/258,120

(22) PCT Filed: Dec. 18, 2020

(86) PCT No.: PCT/CN2020/137572

§ 371 (c)(1),
(2) Date: Jun. 16, 2023

(87) PCT Pub. No.: WO2022/126590

PCT Pub. Date: Jun. 23, 2022

(65) Prior Publication Data

US 2024/0056278 A1 Feb. 15, 2024

(51) Int. Cl.
*H04L 5/14* (2006.01)
*H04L 5/00* (2006.01)
(Continued)

(52) U.S. Cl.
CPC .............. *H04L 5/14* (2013.01); *H04L 5/0048* (2013.01); *H04W 72/0446* (2013.01); *H04W 72/1268* (2013.01)

(58) Field of Classification Search
None
See application file for complete search history.

(56) References Cited

U.S. PATENT DOCUMENTS 11,553,471 B2 * 1/2023 Sun ........................ H04L 5/0094
12,075,405 B2 * 8/2024 Choi ..................... H04L 1/1812
(Continued)

FOREIGN PATENT DOCUMENTS

CN 106063178 A 10/2016
CN 108282879 A 7/2018
(Continued)

OTHER PUBLICATIONS

Intel Corporation , "On PUSCH enhancements for eURLLC", 3GPP TSG RAN WG1 Meeting #95, R1-1812503, Spokane, WA [retrieved May 23, 2023]. Retrieved from the Internet <https://www.3gpp.org/ftp/tsg_ran/WG1_RL1/TSGR1_95/Docs/>., Nov. 2018, 5 Pages.
(Continued)

*Primary Examiner* — Joseph E Avellino
(74) *Attorney, Agent, or Firm* — FIG. 1 Patents

(57) ABSTRACT

Embodiments of the present application are related to methods and apparatuses a physical uplink shared channel (PUSCH) repetition enhancement mechanism for a time division duplex (TDD) scenario. A method according to an embodiment of the present application includes: receiving downlink control information (DCI) including a time domain resource assignment field; determining a time domain resource in each of one or more available uplink slots based on the time domain resource assignment field in the DCI, to obtain the determined one or more time domain resources; and transmitting uplink (UL) data on the determined one or more time domain resources.

20 Claims, 11 Drawing Sheets

(51) Int. Cl.
*H04W 72/0446* (2023.01)
*H04W 72/1268* (2023.01)

(56) References Cited

U.S. PATENT DOCUMENTS

| | | | | |
|---|---|---|---|---|
| 12,101,761 | B2 * | 9/2024 | Shimezawa | H04L 5/0039 |
| 12,213,129 | B2 * | 1/2025 | Taherzadeh Boroujeni | H04W 72/23 |
| 12,267,815 | B2 * | 4/2025 | Bae | H04W 72/0446 |
| 12,273,894 | B2 * | 4/2025 | Takahashi | H04L 5/0048 |
| 12,414,094 | B2 * | 9/2025 | Liu | H04W 72/23 |
| 2016/0330011 | A1 | 11/2016 | Lee et al. | |
| 2019/0159213 | A1 * | 5/2019 | Baldemair | H04L 5/0053 |
| 2020/0267756 | A1 | 8/2020 | Fakoorian et al. | |
| 2023/0062024 | A1 * | 3/2023 | Yuan | H04L 1/08 |
| 2023/0422238 | A1 * | 12/2023 | Kazmi | H04W 72/54 |

FOREIGN PATENT DOCUMENTS

| | | | | |
|---|---|---|---|---|
| CN | 109803380 | A | 5/2019 | |
| CN | 110831187 | A | 2/2020 | |
| CN | 110876201 | A | 3/2020 | |
| CN | 115118406 | A * | 9/2022 | H04L 5/0048 |
| EP | 2802091 | A1 * | 11/2014 | H04W 72/20 |

OTHER PUBLICATIONS

PCT/CN2020/137572 , "International Preliminary Report on Patentability", PCT Application No. PCT/CN2020/137572, Jun. 29, 2023, 5 pages.

PCT/CN2020/137572 , "International Search Report and Written Opinion", PCT Application No. PCT/CN2020/137572, Sep. 22, 2021, 6 pages.

Samsung , "Corrections on DL/UL Resource Allocation", 3GPP TSG RAN WG1 Meeting AH1801, R1-1800451, Vancouver, Canada [retrieved May 23, 2023]. Retrieved from the Internet <https://www.3gpp.org/ftp/TSG_RAN/WG1_RL1/TSGR1_AH/NR_AH_1801/Docs>., Jan. 2018, 11 Pages.

Foreign Office Action issued in CN 202080107991.7, mailed Apr. 21, 2026, 22 pages.

Moderator, "Summary of Email discussion [100b-e-NR-L1enh-URLLC-PUSCH-03] on PUSCH enhancements for NR eURLLC (AI 7.2.5.3)", 3GPP TSG-RAN WG1 Meeting #100bis-e, R1-2003005, Apr. 20, 2020, 30 pages.

* cited by examiner

METHODS AND APPARATUSES FOR A PHYSICAL UPLINK SHARED CHANNEL (PUSCH) REPETITION ENHANCEMENT MECHANISM FOR A TIME DIVISION DUPLEX (TDD) SCENARIO

TECHNICAL FIELD

The present application generally relates to wireless communications, and more particularly, to methods and apparatuses for a physical uplink shared channel (PUSCH) repetition enhancement mechanism for a time division duplex (TDD) scenario.

BACKGROUND

The next generation wireless communication system 5G is an example of an emerging telecommunication standard. New radio (NR) is generally a set of enhancements to the Long Term Evolution (LTE) mobile standard promulgated by the 3rd Generation Partnership Project (3GPP). 5G and/or NR networks are expected to increase network throughput, coverage, and robustness and reduce latency and operational and capital expenditures.

With the development of 5G and/or NR networks, various aspects need to be studied and developed to perfect the 5G and/or NR technology.

SUMMARY

Some embodiments of the present application provide a method for wireless communications performed by a user equipment (UE). The method includes: receiving downlink control information (DCI) including a time domain resource assignment field; determining a time domain resource in each of one or more available uplink (UL) slots based on the time domain resource assignment field in the DCI, to obtain the determined one or more time domain resources; and transmitting UL data on the determined one or more time domain resources.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a UE.

Some embodiments of the present application provide a method for wireless communications performed by a base station (BS). The method includes: transmitting DCI including a time domain resource assignment field; determining a time domain resources in each of one or more available UL slots based on the time domain resource assignment field in the DCI, to obtain the determined one or more time domain resources; and receiving UL data on the determined one or more time domain resources.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a BS.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only exemplary embodiments of the present disclosure and are not therefore intended to limit the scope of the present disclosure.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
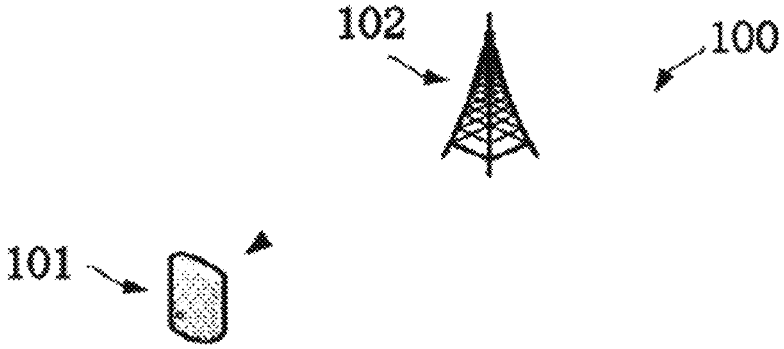
FIG. 1 illustrates a schematic diagram of a wireless communication system in accordance with some embodiments of the present application.

FIG. 1 illustrates a schematic diagram of a wireless communication system in accordance with some embodiments of the present application.

As illustrated and shown in FIG. 1, a wireless communication system 100 includes at least one user equipment (UE) 101 and at least one base station (BS) 102 for illustrative purpose. Although a specific number of UE 101 and BS 102 are depicted in FIG. 1, it is contemplated that any number of UEs 101 and BSs 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), internet of things (IoT) devices, or the like. According to some embodiments of the present application, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present application, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate directly with BS(s) 102 via uplink (UL) communication signals.

The BS(s) 102 may be distributed over a geographic region. In certain embodiments of the present application, each of the BS(s) 102 may also be referred to as an access point, an access terminal, a base, a base unit, a macro cell, a Node-B, an evolved Node B (eNB), a gNB, a NG-RAN (Next Generation-Radio Access Network) node, a Home Node-B, a relay node, or a device, or described using other terminology used in the art. The BS(s) 102 is generally a part of a radio access network that may include one or more controllers communicably coupled to one or more corresponding BS(s) 102. BS(s) 102 may communicate directly with each other. For example, BS(s) 102 may communicate directly with each other via Xn interface or X2 interface.

In some embodiments of the present application, the wireless communication system 100 is compatible with the 5G and/or NR of the 3GPP protocol based on orthogonal frequency division multiplexing (OFDM). The radio resource in time domain is partitioned into subframes, each of which may contain one or more time slots. Each slot may be comprised of various number of OFDM symbols, depending on slot configuration. The radio resource in frequency domain is partitioned into resource blocks, and each of which may contain 12 subcarriers. The wireless communication system may also be based on orthogonal frequency division multiple access (OFDMA) downlink.

In 3GPP 5G and/or NR networks, when there is a downlink packet to be sent from a BS to a UE, each UE gets a downlink assignment, e.g., a set of radio resources in a physical downlink shared channel (PDSCH). When a UE needs to send a packet to a BS in the uplink, the UE gets a grant from the BS that assigns a PUSCH consisting of a set of uplink radio resources. The UE gets the downlink and/or uplink scheduling information from a PDCCH that is targeted specifically to that UE. In addition, broadcast control information is also sent in the PDCCH. The downlink and uplink scheduling information and the broadcast control information, carried by the PDCCH, together is referred to as DCI. As shown in FIG. 1, PDCCHs are used for BS 102 to send DCI to UE 101.

Figure 2A:
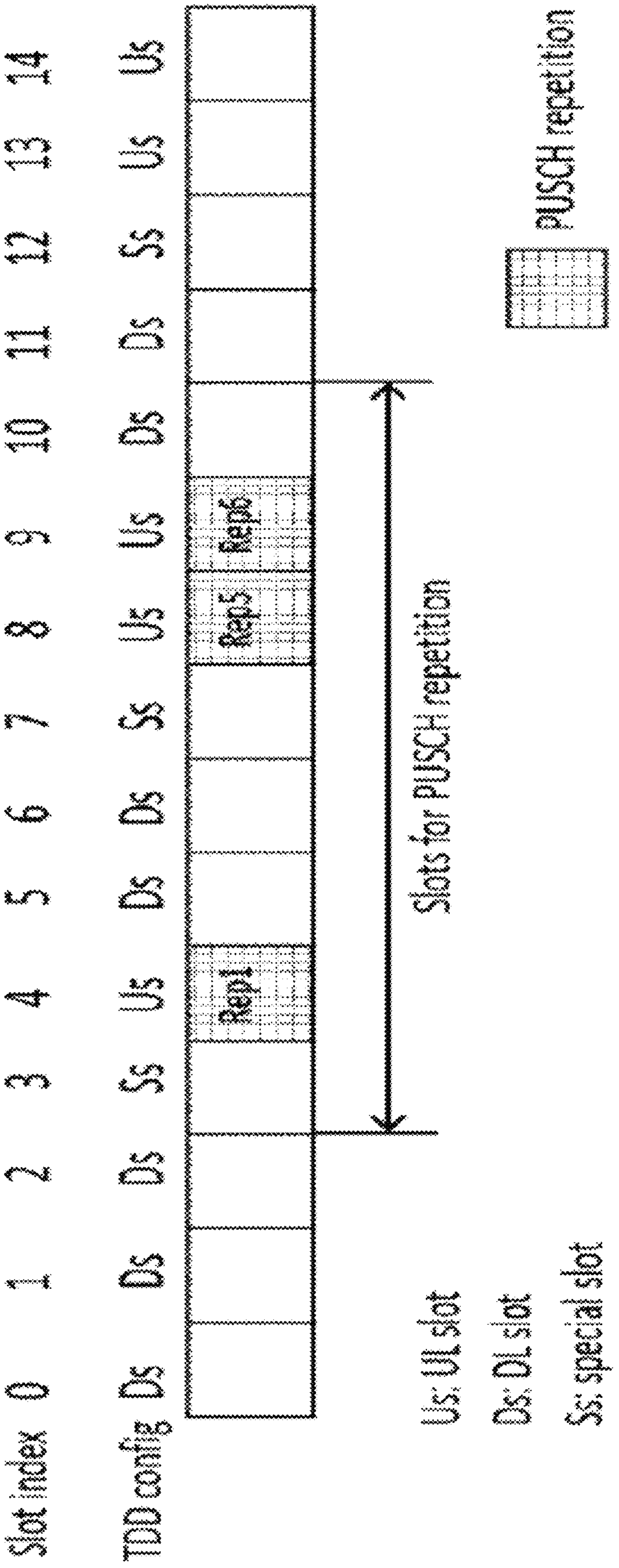
FIG. 2A illustrates a legacy PUSCH repetition type A in accordance with some embodiments of the present application.

Currently, a 3GPP standard work group has approved for supporting a reduced capability NR device that needs coverage recovery. And, current supported NR device (e.g., enhanced mobile broadband (eMBB) or ultra reliable low latency communication (URLLC) UE) needs coverage enhancements. As specified in current NR specification documents, for a PUSCH repetition type A, a total number of PUSCH repetition(s) is counted on consecutive slots. A PUSCH repetition type A needs to be enhanced, especially for a TDD scenario. A specific example is shown in FIG. 2A.

According to 3GPP specification documents TS38.214 and TS38.211, a resource allocation in a time domain is defined by a starting symbol “S” relative to a start of a slot, and a total number of consecutive symbols “L” counting from the symbol “S” allocated for the PUSCH transmission. The starting symbol “S” may also be named as a start symbol. The time resource is configured by a “Time domain resource assignment” field in DCI, a field value “m” provides a row index “m+1” to an allocated table. The allocated table can be a default table specified in TS38.214 or a list of time domain allocations configured by a RRC signaling.

The indexed row of the allocated table provides a start and length indicator value (SLIV), or directly the start symbol “S” and the allocation length “L” and the number of repetitions (if numberofrepetitions is present in the resource allocation table) to be applied in the PUSCH transmission.

For a PUSCH repetition type A, the start symbol “S” relative to the start of the slot, and the number of consecutive symbols “L” counting from the symbol S allocated for the PUSCH transmission are determined from the start and length indicator “SLIV” of the indexed row:

```
if (L-1)≤7 then
 SLIV=14•(L-1)+S
else
 SLIV=14•(14-L+1)+(14-1-S)
where 0<L≤14-S.
```

For a PUSCH repetition type A, in case repetition number K>1, the same symbol allocation is applied across the "K" consecutive slots and the PUSCH is limited to a single transmission layer. The UE shall repeat the transport block (TB) across the "K" consecutive slots applying the same symbol allocation in each slot. For TDD scenario, there may be a slot within the "K" consecutive slots, that symbol allocation for PUSCH in the slot has at least a DL symbol. The PUSCH repetition in the slot will be dropped.

FIG. 2A illustrates a legacy PUSCH repetition type A in accordance with some embodiments of the present application.

In the embodiments of FIG. 2A, there are 15 slots in total, i.e., Slots indexes 0-14, and in the time division duplex (TDD) configuration, Us represents "UL slot" (i.e., an uplink (UL) slot), Ds represents "DL slot" (i.e., a downlink (DL) slot), and Ss represents "Special slot" (i.e., a special slot). As shown in FIG. 2A, a configured PUSCH repetition total number is 8 and slots for PUSCH repetition are slots 3-10. If the TDD configuration indicates that at least one symbol from a set of symbols in one slot of the slots, from which a PUSCH transmission is scheduled for a UE, is a DL symbol, the UE does not transmit the PUSCH repetition in this slot. In FIG. 2A, slots 5, 6, and 10 are DL slots and slots 3 and 7 are special slots that at least one symbol for PUSCH transmission is a DL symbol. Thus, six PUSCH repetitions (i.e., Rep0, Rep2, Rep3, Rep4, and Rep7 as shown in FIG. 2A) in these slots are dropped (which are not shown in FIG. 2A). There are only three PUSCH repetitions (i.e., Rep1, Rep 5, and Rep 6 as shown in FIG. 2A) are transmitted and the actual total number of PUSCH repetition(s) is 3. This can lead to the actual total number of PUSCH repetition(s) is less than the configured nominal total number of PUSCH repetition(s). The coverage performance of PUSC H repetition(s) will degrade significantly. Therefore, the PUSCH repetition type A needs to be enhanced, especially for a TDD scenario.

A UE not capable of full-duplex communication is not expected to transmit in the uplink earlier than $N_{Rx-Tx}$Tc after the end of the last received downlink symbol in the same cell, where $N_{Rx-Tx}$ is given by Table 1. $T_c=1/(\Delta f_{max}\cdot N_f)$ is time units used to express the size of various fields in the time domain, wherein $\Delta f_{max}=480\cdot 10^3$ Hz and $N_f=4096$.

TABLE 1

Transition time $N_{Rx-Tx}$ and $N_{Tx-Rx}$

| Transition time | FR1 | FR2 |
|---|---|---|
| $N_{Tx-Rx}$ | 25600 | 13792 |
| $N_{Rx-Tx}$ | 25600 | 13792 |

According to 3GPP specification documents, a sounding reference signal (SRS) resource in a time domain is configured by the SRS-Resource IE or the SRS-PosResource-r16 IE and consists of:

$$N_{symb}^{SRS}\in\{1, 2, 4, 8, 12\}$$

consecutive OFDM symbols given by the field nrofSymbols contained in the higher layer parameter resourceMapping $l_0$, the starting position in the time domain given by $$l_0 = N_{symb}^{slot} - 1 - l_{offset}$$

where the offset $l_{offset}\in\{0, 1, \ldots, 13\}$ counts symbols backwards from the end of the slot and is given by the field startPosition contained in the higher layer parameter resourceMapping and $$l_{offset} \geq N_{symb}^{SRS} - 1.$$

Figure 2B:
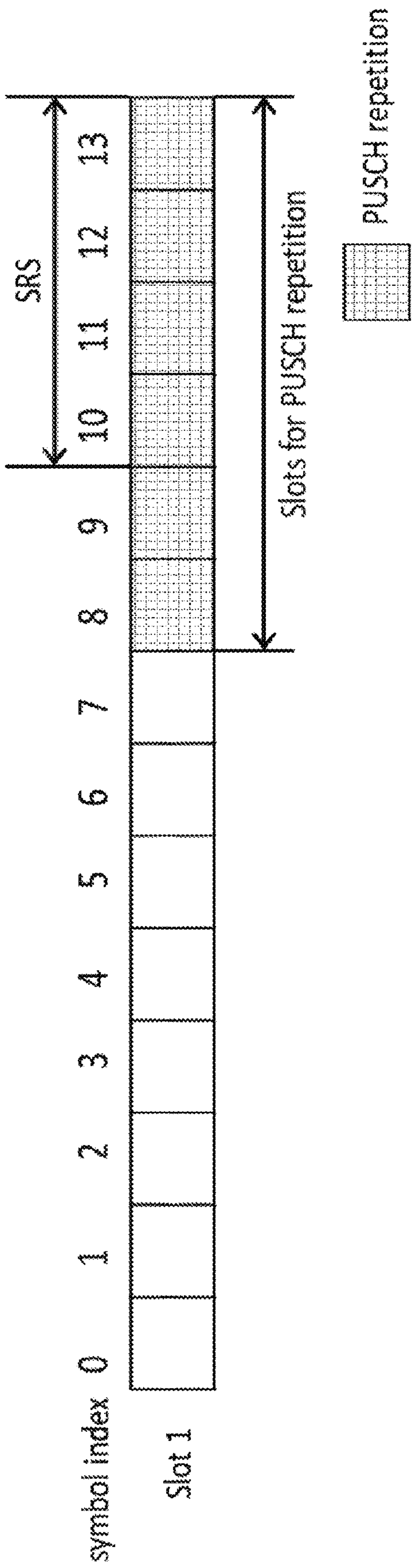
FIG. 2B illustrates an exemplary collision case between PUSCH and sounding reference signal (SRS) resources in accordance with some embodiments of the present application.

There may be cases that SRS and PUSCH resources overlap in a time domain, as shown in FIG. 2B, which illustrates the mechanism to handle the collision between SRS and PUSCH resources in the time domain.

FIG. 2B illustrates an exemplary collision case between PUSCH and sounding reference signal (SRS) resources in accordance with some embodiments of the present application. In the embodiments of FIG. 2B, there are 14 slots in total, i.e., Slots indexes 0-13. As shown in FIG. 2B, slots for PUSCH repetitions are slots 8-13, and the configured SRS time resource is slots 10-13.

In general, a SRS resource can be transmitted in any position of a slot. There can be cases in which all SRS symbols overlap with PUSCH symbols. Based on a mechanism to handle the collision between SRS and PUSCH resources in a time domain, at least the overlapped SRS symbols are dropped. It could impact the uplink channel state estimation and link adaptation operations. Hence, it is better to avoid collisions between SRS and PUSCH resources, if there are enough resources for PUSCH and SRS transmissions. The PUSCH transmission can be transmitted, such as, in symbols 4-9 as shown in FIG. 2B, to avoid collisions with the SRS transmission in symbols 10-13 as shown in FIG. 2B.

As specified in 3GPP specification documents TS38.213 and TS38.331, the time domain resource of a PUCCH transmission includes a start symbol $\in\{0, 1, \ldots, 13\}$ and a number of symbols $\in\{0, 1, 4, \ldots, 13\}$. The PUCCH transmission may overlap with the PUSCH transmission. Similar with the case of the collision between SRS and PUSCH resources, if there are enough resources for PUSCH and PUCCH transmissions, it is better to avoid collisions between PUCCH and PUSCH resources.

Figure 3:
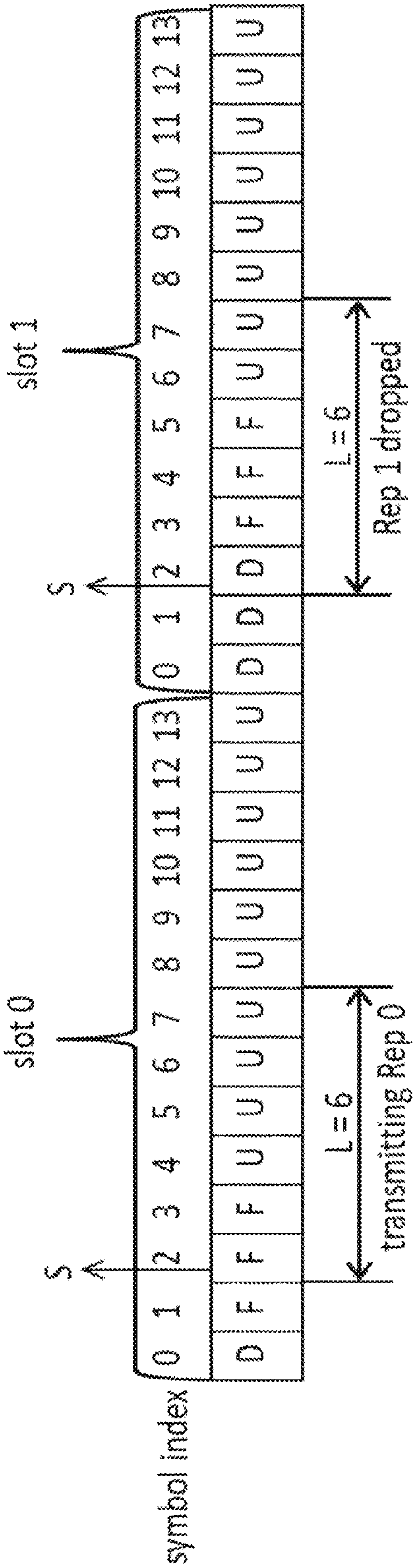
FIG. 3 illustrates an exemplary PUSCH repetition dropped case due to a collision with a DL symbol in accordance with some embodiments of the present application.

FIG. 3 illustrates an exemplary PUSCH repetition dropped case due to a collision with a DL symbol in accordance with some embodiments of the present application.

In the embodiments of FIG. 3, in the TDD configuration, U represents "UL symbol", D represents "DL symbol", and F represents "Flexible symbol". Flexible symbol may also be named as F symbol. Each of Slot 0 and Slot 1 includes 14 symbols as shown in FIG. 3. The embodiments of FIG. 3 assume that a "time domain resource assignment" field in the scheduling DCI configures the time domain resource for PUSCH as S=2, L=6. That is, the start symbol "S" of Slot 0 for transmitting PUSCH Rep 0 is the second "F", i.e., symbol index 2 in Slot 0, and a total number of consecutive symbols "L" counting from the symbol "S" in slot 0 allocated for the PUSCH transmission is 6. The start symbol "S"

of Slot 1 for transmitting PUSCH Rep 0 is the third "D", i.e., symbol index 2 in Slot 1, and a total number of consecutive symbols "L" counting from the symbol "S" in slot 0 allocated for the PUSCH transmission is 6.

Based on the current 3GPP NR specification document, PUSCH Rep 0 is transmitted in Slot 0. However, there is a DL symbol in the resource configured by the scheduling DCI in Slot 1, i.e., the start symbol "S" of Slot 1 as shown in FIG. 3, and thus the PUSCH Rep 1 has to be dropped. In fact, there are enough UL or flexible symbols to transmit the PUSCH Rep 1. Thus, the transmission efficiency of PUSCH repetitions is low and needs to be enhanced, especially for a TDD scenario.

Given the above, following issues need to be considered: whether this special slot can be determined as an available UL slot and how to determine transmission occasion (a set of symbols used for PUSCH repetition) in a special slot based on a "time domain resource assignment" field in the scheduling DCI. If the total number of repetitions is counted on the basis of available UL slots, there are needs to: develop a mechanism to determine whether special slot can be determined as an available UL slot; and develop a mechanism to determine a transmission occasion (a set of symbols used for PUSCH repetition) of an actual repetition based on the "time domain resource assignment" field in the scheduling DCI.

Some embodiments of the present application provide a PUSCH repetition enhancement mechanism for a TDD scenario in 3GPP 5G NR system or the like in an efficient way. Some embodiments of the present application provide mechanisms in which a total number of repetitions is counted on the basis of available UL slots.

Some embodiments of the present application provide mechanisms to define an available UL slot to determine whether special slot(s) can be determined as available UL slot(s). Some embodiments of the present application provide mechanisms to define rules to determine a set of symbols to transmit PUSCH repetition(s) in an available UL slot. Some embodiments of the present application provide mechanisms to define mechanism to determine a set of symbols to transmit PUSCH repetition(s) to handle collisions with PUCCH or SRS resources.

The TDD configuration for a slot shown in the embodiments of the present application is after a UE applies all slot formats as indicated by tdd-UL-DL-ConfigurationCommon if provided, and tdd-UL-DL-ConfigurationDedicated if provided, and DCI 2_0 if the UE is configured to monitor PDCCH for DCI format 2_0, as described in 3GPP specification document TS38.213. More details will be illustrated in the following text in combination with the appended drawings.

Figure 4:
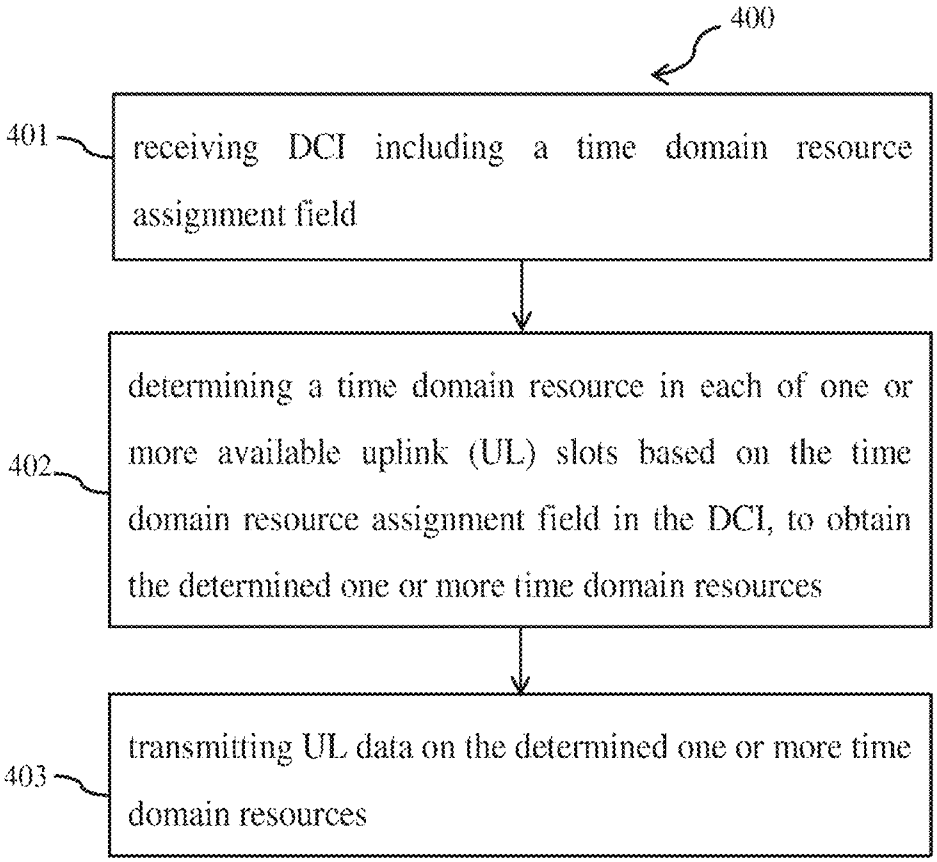
FIG. 4 illustrates a flow chart of a method for determining a time domain resource in accordance with some embodiments of the present application.

FIG. 4 illustrates a flow chart of a method for determining a time domain resource in accordance with some embodiments of the present application.

The exemplary method 400 may be performed by a UE (e.g., UE 101 as shown and illustrated in any of FIG. 1). Although described with respect to a UE, it should be understood that other device(s) may be configured to perform the method as shown and illustrated in FIG. 4.

In the exemplary method 400 as shown in FIG. 4, in operation 401, a UE (e.g., UE 101 as shown and illustrated in FIG. 1) receives DCI including a time domain resource assignment field. In operation 402, the UE determines a time domain resource in each of one or more available uplink (UL) slots based on the time domain resource assignment field in the DCI, to obtain the determined one or more time domain resources. In operation 403, the UE transmits UL data on the determined one or more time domain resources. In one embodiment, the UL data includes a PUSCH repetition (e.g., a PUSCH repetition type A).

In some embodiments, the one or more available UL slots include a special type slot. The special type slot may include: one or more flexible symbols; or the one or more flexible symbols, and at least one of a downlink (DL) symbol and an UL symbol.

In an embodiment, the special type slot includes one or more flexible symbols and one or more DL symbols. In a further embodiment, the special type slot includes one or more flexible symbols and one or more UL symbols. In another embodiment, the special type slot includes one or more flexible symbols, one or more DL symbols, and one or more UL symbols.

According to some embodiments, the special type slot includes a set of consecutive symbols in a time domain. In one example, the set of consecutive symbols may include at least one flexible symbol and at least one UL symbol. In a further example, the set of consecutive symbols may only include one or more flexible symbols. In another example, the set of consecutive symbols may only include one or more UL symbols.

In an embodiment, a maximum symbol total number of the set of consecutive symbols (e.g., which may be marked as "M") is larger than or equal to a sum of "a configured value" and "a value associated with receiving-transmission transition time". The value associated with receiving-transmission transition time is larger than or equal to 0. Specific embodiments are shown in FIGS. 5A, 5B, and 6-13.

If a receiving-transmission transition time, which may be marked as "Rx-Tx transition time", is needed, a gap between the determined new start symbol "S" and the first symbol of the available symbol set "R" cannot be smaller than a Rx-Tx transition time. If considering other factors, the gap between the determined start symbol "S" and the first symbol of "R" is smaller than a Rx-Tx transition time, the new start symbol "S" is determined by the first symbol in the available symbol set "R" and the Rx-Tx transition time.

In an example, the configured value is configured by radio resource control (RRC) signaling. In a further example, the configured value is derived from a start and length indicator value (SLIV). The SLIV may be determined based on the time domain resource assignment field in the DCI received in operation 401. In another example, the configured value is derived from an allocation length value (e.g., which may be marked as "L"). The allocation length value "L" may be determined based on the time domain resource assignment field. For instance, the configured value may be computed as L multiplied by a scaling factor. Or, the configured value may be computed as equivalent to the value of L.

According to some embodiments, in operation 402, during the UE determining the time domain resource, the UE determines one of following sets in a slot within the one or more available UL slots, as an available symbol set (e.g., which may be marked as "R"):

(1) A set of available symbols of a first occurrence in a time domain.

(2) A set of available symbols closest, in the time domain, to a starting symbol of the slot within the one or more available UL slots. The starting symbol is determined based on the time domain resource assignment field.

(3) A set of available symbols not including a PUCCH resource or a SRS resource, if there are, in the time domain, the set of available symbols not including the PUCCH resource or the SRS resource and a set of available symbols including at least one of a PUCCH resource and a SRS resource.

(4) A set of available symbols including a least symbol total number of a PUCCH resource and a SRS resource, if there are, in the time domain, two or more sets of available symbols including at least one of a PUCCH resource and a SRS resource.

In some embodiments, a starting symbol of the time domain resource in each of the one or more available UL slots may be determined by at least one of:

(1) A symbol of a first occurrence in a time domain within the available symbol set, i.e., the first symbol within the available symbol set in the time domain, which may also be named as an initial symbol within the available symbol set.

(2) A flexible symbol of a first occurrence in the time domain within the available symbol set, i.e., the first flexible symbol within the available symbol set in the time domain, which may also be named as an initial flexible symbol within the available symbol set.

(3) An UL symbol of a first occurrence in the time domain within the available symbol set, i.e., the first UL symbol within the available symbol set in the time domain, which may also be named as an initial UL symbol within the available symbol set.

Figure 10:
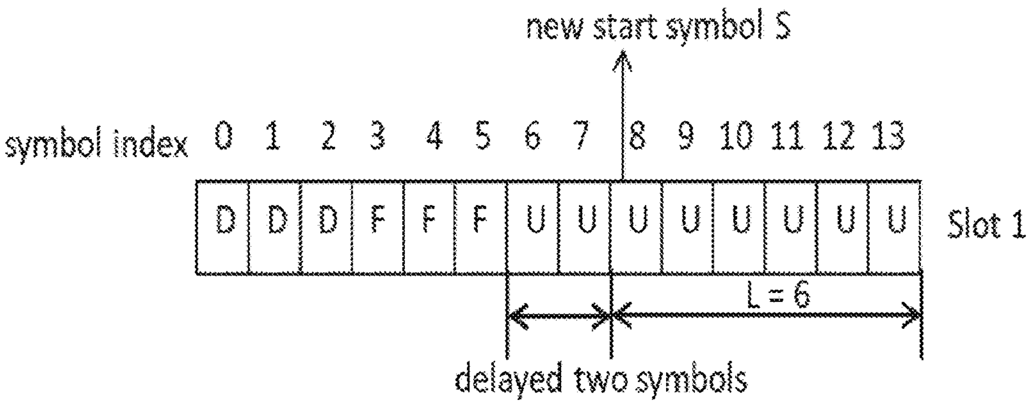
FIG. 10 illustrates another example for determining a new start symbol of a time domain resource in accordance with some embodiments of the present application.
Figure 11:
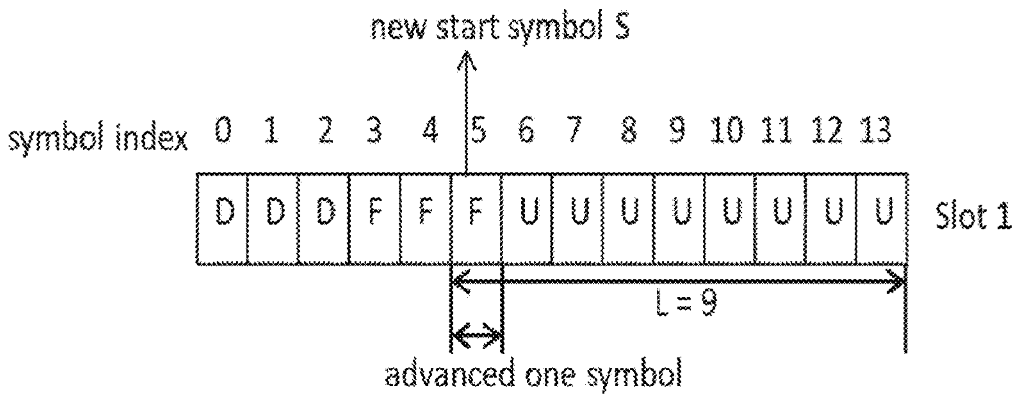
FIG. 11 illustrates yet another example for determining a new start symbol of a time domain resource in accordance with some embodiments of the present application.

(4) A difference between an allocation length value (i.e., "L") and a maximum symbol total number of consecutive UL symbols within the available symbol set (e.g., which may be marked as "N"). The allocation length value "L" may be determined based on the time domain resource assignment field. Specific embodiments are shown in FIGS. 10 and 11.

Figure 8:
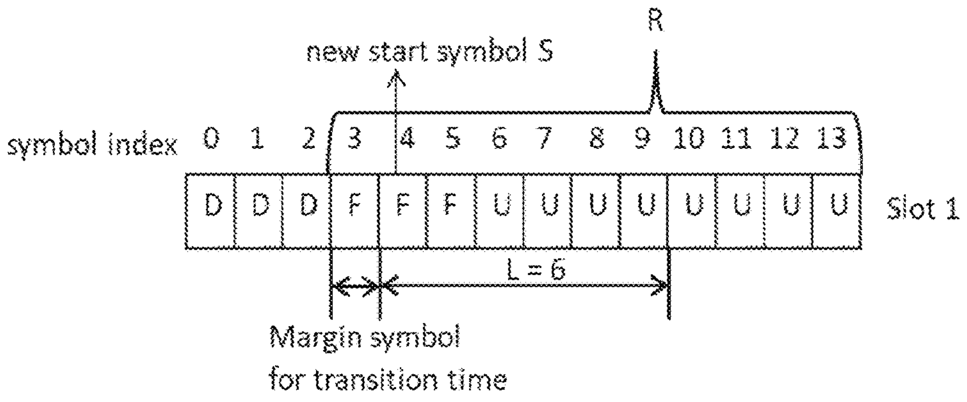
FIG. 8 illustrates an example for determining a new start symbol of a time domain resource in accordance with some embodiments of the present application.
Figure 12:
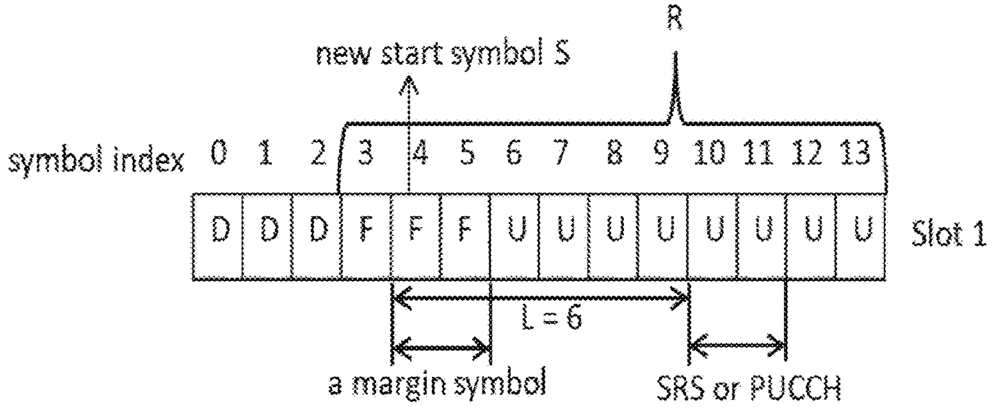
FIG. 12 illustrates yet another example for determining a new start symbol of a time domain resource in accordance with some embodiments of the present application.

(5) A margin symbol in the time domain of the time domain resource. Specific embodiments are shown in FIGS. 8, 11, and 12.

For instance, the margin symbol in the time domain of the time domain resource may be determined by one of:

(1) RRC signaling;

(2) receiving-transmission transition time;

(3) a duration of one or more overlapping symbols in the available symbol set, wherein the one or more overlapping symbols carry at least one of a SRS resource and a PUCCH resource; and (4) a starting symbol of the one or more overlapping symbols, an UL symbol of a first occurrence in the time domain within the available symbol set, and the allocation length value.

Details described in all other embodiments of the present application (for example, details of a PUSCH repetition enhancement mechanism for TDD) are applicable for the embodiments of FIG. 4. Moreover, details described in the embodiments of FIG. 4 are applicable for all the embodiments of FIGS. 1-3 and 5-15.

According to some embodiments, for PUSCH repetition type A, a total number of repetitions may be counted on the basis of available UL slots in following two cases.

Case 1:

Available UL slots are slots that a maximum number of consecutive flexible symbols and UL symbols are larger than or equal to "M plus a possible needed Rx-Tx transition time". If a received DL symbol is before the consecutive flexible symbols and UL symbols, it may need the Rx-Tx transition time for the next UL transmission.

Therefore, a maximum number of consecutive flexible symbols and UL symbols should be larger than or equal to "M plus a Rx-Tx transition time". Otherwise, a maximum number of consecutive flexible symbols and UL symbols should be larger than or equal to M. M can be determined by SLIV of the scheduling DCI (e.g., an allocation length value "L"). For example, in some cases, M=L. The following descriptions for embodiments are shown in FIGS. 5A, 5B, and 6-13 are based on the assumption of M=L.

Case 2:

Available UL slots are slots that a maximum number of consecutive UL symbols are larger than or equal to "M plus a possible needed Rx-Tx transition time". If a received DL symbol is before the consecutive UL symbols, it may need the Rx-Tx transition time for the next UL transmission. Therefore, maximum number of consecutive UL symbols should be larger than or equal to "M plus the Rx-Tx transition time". Otherwise, the maximum number of consecutive UL symbols should be larger than or equal to M. M can be determined by SLIV of the scheduling DCI (e.g., an allocation length value "L"). For example, in some cases, M=L.

According to some embodiments of the present application, the symbols available for the PUSCH transmission in the available UL slot (consecutive flexible symbols and UL symbols) may be called "an available symbols set" or "an available symbol sets" or the like. In an available UL slot, more than one available symbol sets may exist. A UE can select an available symbol set among the multiple available symbol sets to transmit PUSCH repetition(s) firstly.

Figure 5A:
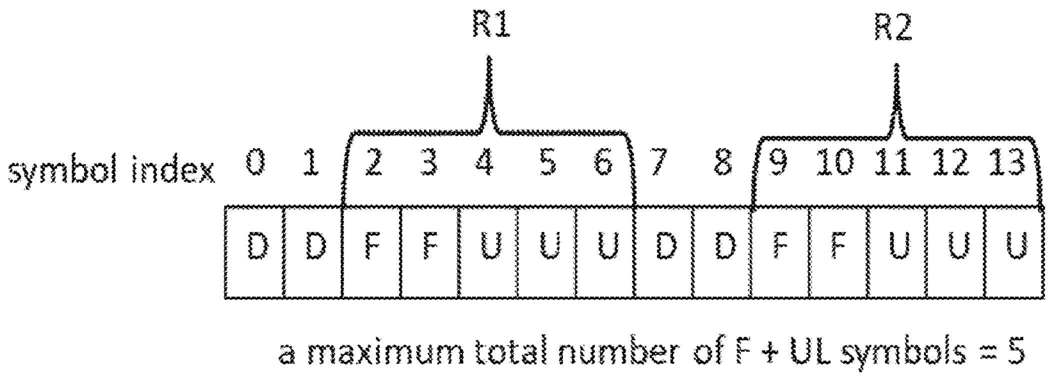
FIG. 5A illustrates two exemplary sets of available symbols in an available UL slot in accordance with some embodiments of the present application.

FIG. 5A illustrates two exemplary sets of available symbols in an available UL slot in accordance with some embodiments of the present application.

The embodiments of FIG. 5A show one slot which includes 14 symbols. Similar to FIG. 3, in the embodiments of FIG. 5A, in the TDD configuration of the slot, U represents "UL symbol", D represents "DL symbol", and F represents "Flexible symbol" which may also be named as "F symbol". From a UE's perspective, a F symbol and an UL symbol are available symbols for transmitting UL data, and a DL symbol is an unavailable symbol for transmitting UL data.

Based on symbol structures of the slot as shown in FIG. 5A, the slot is an available UL slot, two available symbol sets "R1" and "R2" exist in the slot, and each available symbol set includes maximum five available symbols (i.e., two F symbols and three UL symbols). Thus, a maximum total number of F+UL symbols in each available symbol set in the slot equals to 5, as shown in FIG. 5A. That is, a maximum total number of F+UL symbols in the slot equals to 5. In the embodiments of FIG. 5A, a UE can select one available symbol set among these two available symbol sets "R1" and "R2", to transmit PUSCH repetition(s) firstly. In one embodiment, the UE can select "R1", which is a set of available symbols of a first occurrence in the time domain.

Figure 5B:
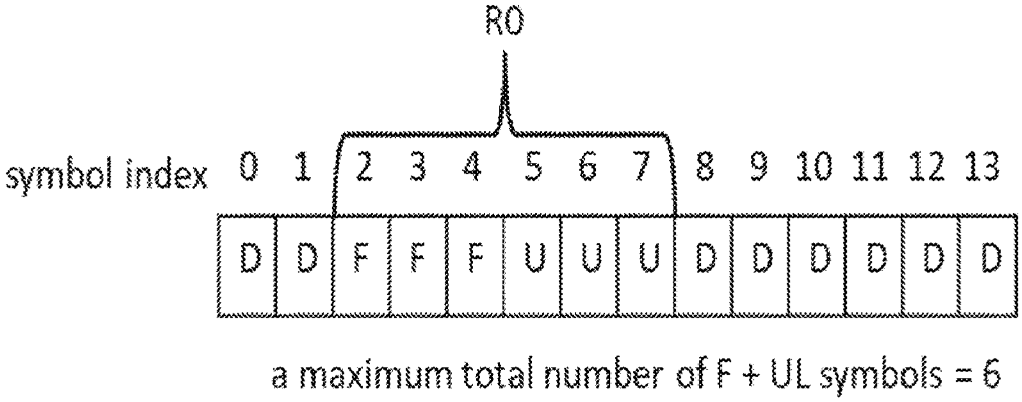
FIG. 5B illustrates an exemplary set of available symbols in an available UL slot in accordance with some embodiments of the present application.

FIG. 5B illustrates an exemplary set of available symbols in an available UL slot in accordance with some embodiments of the present application.

Similar to FIG. 5A, the embodiments of FIG. 5B show one slot which includes 14 symbols. The TDD configuration "U", "D", and "F" of the slot shown in FIG. 5B are the same as those in FIGS. 3 and 5A. Based on symbol structures of the slot as shown in FIG. 5B, the slot is an available UL slot, only one available symbol set "R0" exists in the slot, and this available symbol set includes maximum six available symbols (i.e., three F symbols and three UL symbols). That is, a maximum total number of F+UL symbols in the available symbol set "R0" in the slot equals to 6, as shown in FIG. 5B. In the embodiments of FIG. 5B, a UE can only transmit PUSCH repetition(s) in the available symbol set "R0".

In general, in addition to a PUSCH transmission, a UE can also transmit SRS and PUCCH. In the current 3GPP NR specification document, a mechanism to handle collisions between PUSCH and PUCCH or SRS resources has been defined. To reduce the collisions between PUSCH and PUCCH or SRS resources, the UE could select an available symbol set with no PUCCH or SRS resource or minimal PUCCH or SRS resource.

According to some embodiments of the present application, if there is no PUCCH or SRS transmission in a slot, the UE can choose the first available symbol set in the slot in the time domain, to transmit PUSCH repetition(s), or the UE can choose the available symbol set closest to a starting symbol S (i.e., the old S, which is determined by SLIV). The selected available symbol set may be marked as "R". In some embodiments, if there is only one available symbol set in a slot, the first (UL or F) symbol in available symbol set "R" may be the first (UL or F) symbol in the slot in the time domain.

In some embodiments, for a slot from the multiple slots, a PUSCH transmission in the slot of a multi-slot PUSCH transmission is delayed, if the slot is not an available UL slots. Assuming that special slots meet the condition of available UL slot(s), an example of enhanced PUSCH repetition type A is shown in FIG. 6.

Figure 6:
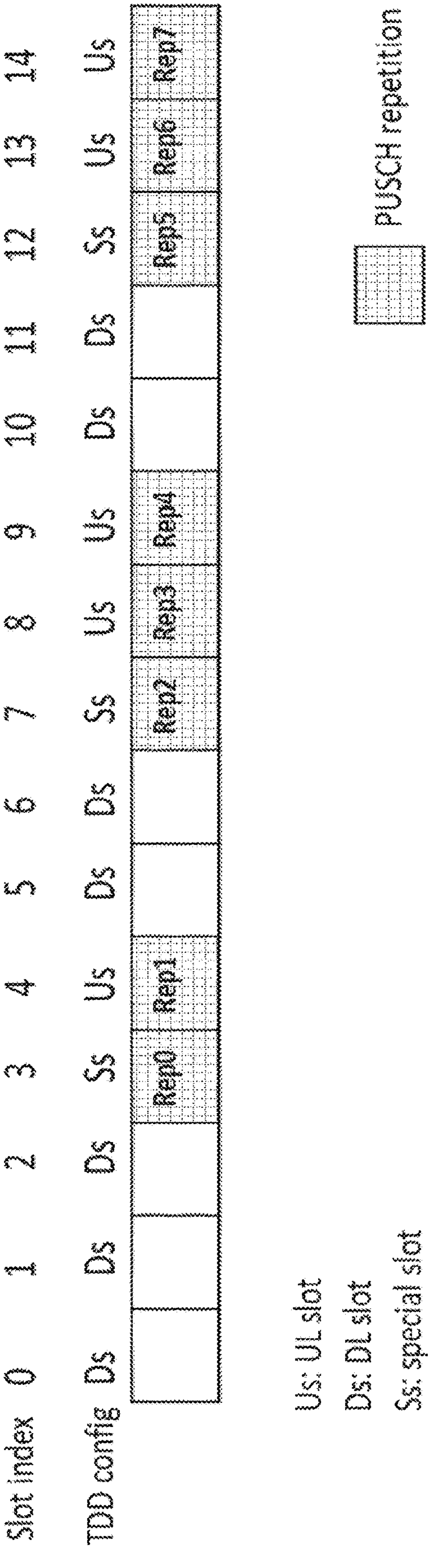
FIG. 6 illustrates exemplary PUSCH repetition transmissions for an enhanced PUSCH repetition type A in accordance with some embodiments of the present application.

FIG. 6 illustrates exemplary PUSCH repetition transmissions for an enhanced PUSCH repetition type A in accordance with some embodiments of the present application.

The embodiments of FIG. 6 have the same slots indexes, TDD configurations, a start slot for PUSCH repetition and a configured PUSCH repetition number as those in the embodiments of FIG. 2A. The embodiments of FIG. 6 assume that special slots (i.e., Slots indexes 3, 7, and 12) meet the condition of available UL slots. Thus, special slots (i.e., Slots indexes 3, 7, and 12) can be used to transmit PUSCH repetition as shown in FIG. 6. Rep 0 and Rep 1 are transmitted in slots 3 and 4 respectively. Slot 5 and slot 6 are DL slots, which not meets the condition of available UL slots, so Rep 2 and Rep 3 are delayed to slot 7 and slot 8, which are available slots. Based on the mechanism, Reps 4, 5, 6, 7 are transmitted in slots 9, 12, 13, and 14 respectively. Compared to FIG. 2A, the enhanced PUSCH repetition type A in FIG. 6 can guarantee that the actual total number of PUSCH repetition(s) equals to the nominal PUSCH repetition total number (i.e., the configured PUSCH repetition number 8).

Figure 7:
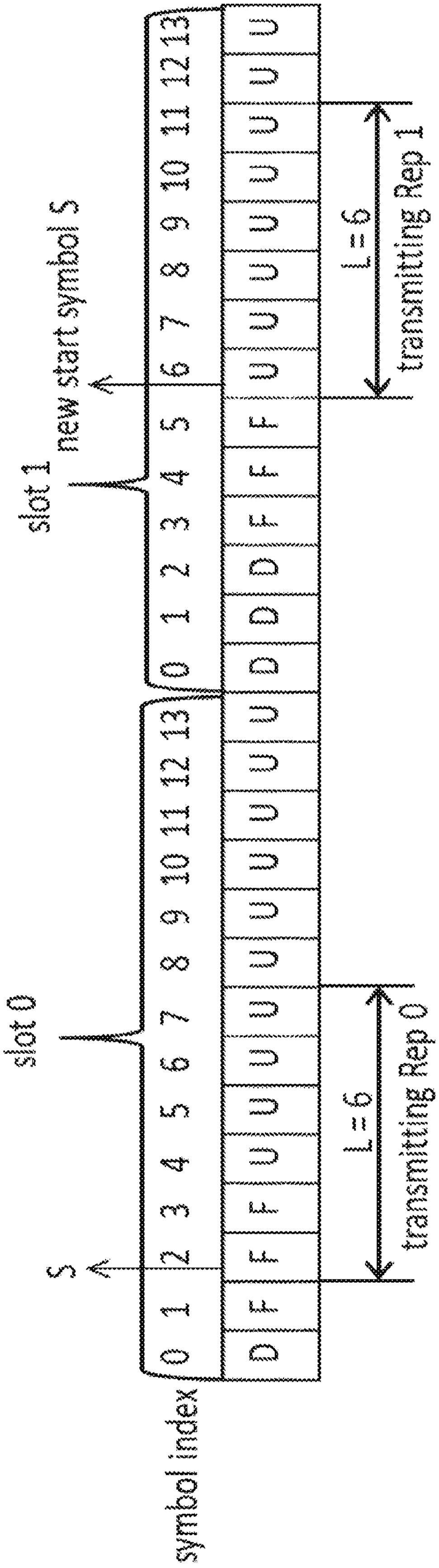
FIG. 7 illustrates exemplary available UL slots in an enhanced PUSCH repetition type A in accordance with some embodiments of the present application.

FIG. 7 illustrates exemplary available UL slots in an enhanced PUSCH repetition type A in accordance with some embodiments of the present application.

The embodiments of FIG. 7 have the same slots indexes and TDD configurations as those in the embodiments of FIG. 3. Similar to FIG. 3, in the embodiments of FIG. 7, Slot 0 is an available UL slot, and a set of symbols in Slot 0, which includes three F symbols and three UL symbols, are used to transmit PUSCH repetition Rep 0.

Compared to the embodiments of FIG. 3 in which Slot 1 is determined as an unavailable UL slot, based on the enhancement PUSCH repetition type A in FIG. 7, Slot 1 is also determined as an available UL slot. The UE can determine a set of symbols in Slot 1 with a new start symbol S as shown in FIG. 7, to transmit the PUSCH repetition Rep 1. How to determine the set of symbols in Slot 1 to transmit the PUSCH repetition based on "time domain resource assignment" in the scheduling DCI is illustrated as follows.

According to some embodiments of the present application, for an available UL slot, steps of determining a set of symbols for PUSCH transmission based on a "time domain resource assignment" field in the scheduling DCI are as follows:

(1) Step 0: A UE determines a set of symbols (e.g., S and L) in the slot according to a "time domain resource assignment" field in the scheduling DCI.

(2) Step 1: If the set of symbols cannot be used for a PUSCH transmission, and if more than one "available symbol set" exit, the UE selects an "available symbol set", marked as "R", from those more than one "available symbol sets".

(3) Step 2: The UE determines a new set of symbols for the PUSCH transmission in the slot or in the available symbol set "R".

Although the resources allocated to a PUSCH transmission on different slots can be different, the embodiments of the present application use a single "time domain resource assignment" field in the DCI to configure resources, which reduces the DCI's overhead.

If the total number of symbols in an available symbol set R is greater than or equals to L plus a possible a Rx-Tx transition time, there are enough resources for the PUSCH repetition transmission. Some embodiments of the present application assume that the allocation length L for the set of symbols for PUSCH transmission is not changed. Therefore, a new set of symbols can be understood as having a new start symbol "S". The following embodiments in FIGS. 8-12 define how to determine a new set of symbols in the slot or in an available symbol set, for the PUSCH repetition transmission.

In some embodiments, a new start symbol S is determined at least by a first symbol in available symbol set "R" in the time domain and a margin symbol for Rx-Tx transition time. The first symbol in available symbol set "R" in the time domain can be used as the new start symbol S. However, if a received DL symbol is before the first symbol in the time domain, it may need a margin symbol for Rx-Tx transition time. For instance, the margin symbol for Rx-Tx transition time can be configured by RRC signaling or determined by Rx-Tx transition time implicitly.

FIG. 8 illustrates an example for determining a new start symbol of a time domain resource in accordance with some embodiments of the present application.

The embodiments of FIG. 8 show one slot, which includes 14 symbols. The slot in FIG. 8 is the same as slot 1 in FIG. 3. So, the TDD format of the slot in FIG. 8 is the same as that of slot 1 in FIG. 3, which is configured as 3D:3F:8U, that is, 3 DL symbols, 3 flexible symbols, and 8 UL symbols. The embodiments of FIG. 8 also assume that SLIV of the scheduling DCI configures the time domain resource for PUSCH as S=2 and L=6, which is the same as those in the embodiments of FIG. 3. Compared to slot 1 in FIG. 3, the embodiments of FIG. 8 determine a new start symbol S to make slot 1 as an available UL slot. FIG. 8 considers the Rx-Tx transition time of a UE and refers to a PUSCH repetition enhanced mechanism for a TDD scenario.

Based on the TDD format of Slot 1, an available symbol set "R" in Slot 1 in FIG. 8 includes 3 F symbols and 8 UL symbols. A received DL symbol is before the first flexible symbol, so the Rx-Tx transition time of a UE is needed. According to the embodiments of FIG. 8, a first symbol in "R" in the time domain (i.e., the first F symbol in "R" in the time domain, symbol index 3 as shown in FIG. 8) is used for Rx-Tx transition time. In the case that the first F symbol in the available symbol set "R" is determined as "a margin symbol for Rx-Tx transition time", a new start symbol "S" may be determined as the second F symbol (i.e., symbol index 4 as shown in FIG. 8) in the available symbol set "R" as shown in FIG. 8. Since SLIV of the scheduling DCI determines that the allocation length L=6, a total number of six consecutive symbols "L" counting from the new start symbol S (which include two F symbols and four UL symbols, i.e., symbol indexes 4-9 as shown in FIG. 8) are allocated for the PUSCH transmission.

Compared to FIG. 3, the PUSCH repetition enhanced mechanism for a TDD scenario as shown in FIG. 8 can transmit a PUSCH to be dropped due to the start symbol S being a DL symbol as shown in FIG. 3, and can easily determine the set of symbols for PUSCH repetition. However, it can cause flexible symbols to be used first, but, UL symbols are not used. This can affect the flexibility of a BS's scheduling. That is, a BS might want to use flexible symbols for certain DL transmissions. The following text provides some other embodiments for providing a PUSCH repetition enhanced mechanism for a TDD scenario.

In some embodiments, a new start symbol S is determined by at least one of: a first UL symbol in the available symbol set "R" in the time domain, a first flexible symbol in "R" in the time domain, the difference between "L" and the maximum total number of consecutive UL symbols (which may be marked as "N"), a margin symbol for Rx-Tx transition time, and a margin symbol associated with overlapping PUCCH and SRS symbols in the available symbol set "R".

A special case of a special slot is that, if there is no UL symbol in "R", the new start symbol S is determined at least by a first flexible symbol in "R" in the time domain, the difference between "L" and the maximum total number of consecutive UL symbols (e.g., "N"), a margin symbol for Rx-Tx transition time, and a margin symbol associated with overlapping PUCCH and SRS symbols in the available symbol set "R".

General cases of a special slot are that, if UL symbols exist in the available symbol set "R", the new start symbol S is determined at least by a first UL symbol in the available symbol set "R" in the time domain, the difference between the allocation length L and the maximum number of consecutive UL symbols (e.g., "N"), a margin symbol for Rx-Tx transition time, and a margin symbol associated with overlapping PUCCH and SRS symbols in the available symbol set "R". Based on these general cases, there may be following options:

(1) Option 1: If L<=N or UL symbol is in front of flexible symbol in the available symbol set "R", the new start symbol S can be the first UL symbol in the available symbol set "R" in the time domain.

(2) Option 2: If L<=N and a flexible symbol (i.e., a F symbol) is in front of an UL symbol, the new start symbol S can be delayed for several symbols from the first UL symbol in the time domain, so that there can be less fragmented resources. The delayed symbol number is determined by the difference between L and N.

(3) Option 3: If L>N and a flexible symbol is in front of an UL symbol, the new start symbol S can be advanced for several symbols from the first UL symbol in the time domain. The advanced symbol number is determined by "the difference between L and N" and "a margin symbol for Rx-Tx transition time".

(4) Option 4: If an "available symbols set" overlaps with symbols for SRS or PUCCH transmission, the new start symbol S can be determined considering the SRS or PUCCH transmission. The margin symbol is related to the SRS or PUCCH transmission. An specific example is shown in FIG. 12.

In Option 4, on one hand, if a slot meets the condition of an available UL slot considering symbols for a SRS or PUCCH transmission as unavailable symbols, the new start symbol S may be delayed or advanced by a margin symbol. This margin symbol can be configured by RRC signalling or can be determined by the starting symbol of the SRS or PUCCH transmission, a first UL symbol in the time domain and L. For example, the margin symbol=L−|first UL symbol index−starting symbol index of SRS/PUCCH|. If the SRS or PUCCH transmission is configured to transmit at the edge symbol of "R", the margin symbol can be determined by the duration of the SRS or PUCCH transmission in the slot.

In Option 4, on the other hand, if a slot doesn't meet the condition of an available UL slot considering symbols for a SRS or PUCCH transmission as unavailable symbols, the new start symbol S may be determined without considering the SRS or PUCCH transmission. The collision(s) between a PUSCH transmission and the SRS or PUCCH transmission can be handled by a mechanism in the current 3GPP NR specification document.

Figure 9:
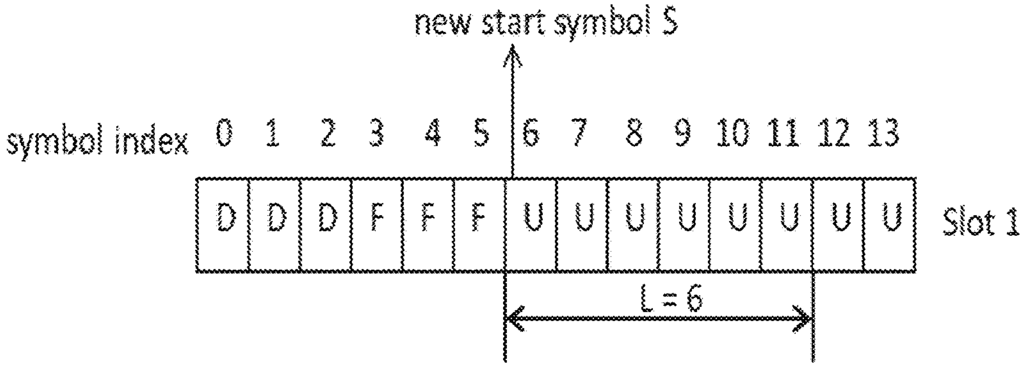
FIG. 9 illustrates a further example for determining a new start symbol of a time domain resource in accordance with some embodiments of the present application.

FIG. 9 illustrates a further example for determining a new start symbol of a time domain resource in accordance with some embodiments of the present application.

The embodiments of FIG. 9 show one slot, which includes 14 symbols. The slot in FIG. 9 is the same as slot 1 in FIG. 3 and Slot 1 in FIG. 8. The TDD configurations of "U", "D", and "F" of Slot 1 as shown in FIG. 9 are the same as those in FIGS. 3 and 8, and an available symbol set in Slot 1 as shown in FIG. 9 also includes 3 F symbols and 8 UL symbols. In the embodiments of FIG. 9, the maximum number of consecutive UL symbols "N" equals to 8. The embodiments of FIG. 9 also assume that SLIV of the scheduling DCI can determine that the allocation length L=6, which is the same as those in FIGS. 3 and 8.

According to Option 1, since L<N in the embodiments of FIG. 9, the new start symbol S can be the first UL symbol in the available symbol set in the time domain (i.e., symbol index 6 as shown in FIG. 9).

FIG. 10 illustrates another example for determining a new start symbol of a time domain resource in accordance with some embodiments of the present application.

The embodiments of FIG. 10 have the same TDD configurations as those in FIGS. 8 and 9. According to Option 2, since L<=N and a F symbol is in front of an UL symbol in the embodiments of FIG. 10, the new start symbol S can be delayed for several symbols from the first UL symbol in the time domain, so that there can be less fragmented resources. The delayed symbol number is determined by the difference between L and N. The same as FIG. 9, in the embodiments of FIG. 10, L equals to 6, and N equals to 8. A difference between L and N is 2. Thus, in the embodiments of FIG. 10, the first and second UL symbols in the time domain are the delayed two symbols, the third to the eighth UL symbols are determined as allocated resources for PUSCH repetition type A, and a new start symbol S is the third UL symbol in Slot 1, as shown in FIG. 10.

FIG. 11 illustrates yet another example for determining a new start symbol of a time domain resource in accordance with some embodiments of the present application.

The embodiments of FIG. 11 have the same TDD configurations as those in FIGS. 8-10. The TDD format of Slot 1 is also configured as 3D:3F:8U. The maximum number of consecutive UL symbols N of Slot 1 equals to 8. The embodiments of FIG. 11 assume that SLIV of the scheduling DCI determines L=9. A difference between L and N is 1. According to Option 3, the new start symbol S is advanced for one symbol from the first UL symbol in Slot 1 in the time domain. That is, the third F symbol is a new start symbol S as shown in FIG. 11.

FIG. 12 illustrates yet another example for determining a new start symbol of a time domain resource in accordance with some embodiments of the present application.

The embodiments of FIG. 12 have the same TDD configurations as those in FIGS. 8-11. Similar to FIG. 8, the TDD format of Slot 1 is also configured as 3D:3F:8U. The maximum number of consecutive UL symbols N of Slot 1 equals to 8. The embodiments of FIG. 11 assume that SLIV of the scheduling DCI determines L=6. According to Option 4, considering the start symbol index for SRS or PUCCH transmission is 10, the first UL symbol index is 6 and L equals to 6, a margin symbol is determined as 2 symbols by the formula: the margin symbol=L−|first UL symbol index−starting symbol index of SRS/PUCCH|. A new start symbol S can be advanced two F symbols, i.e., the margin symbol as shown in FIG. 12. The new start symbol S is the second F symbol of Slot 1 in the time domain.

According to some embodiments, a UE can determine an available symbol set considering symbols for a SRS or PUCCH transmission as unavailable symbols. If there is not any available symbols set meets the condition of an available UL slot when considering symbols for SRS or PUCCH transmission as unavailable symbols, the UE may determine an available symbol set without considering the symbols for SRS or PUCCH transmission. A specific example is shown in FIG. 13.

Figure 13:
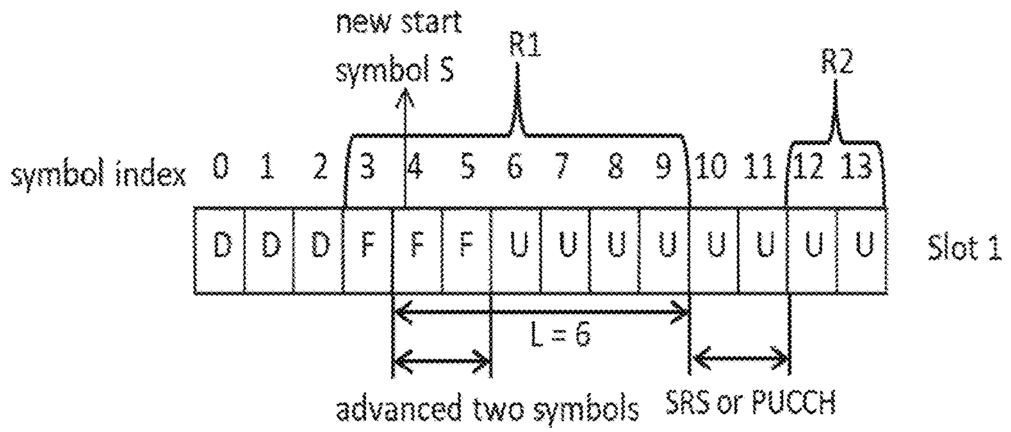
FIG. 13 illustrates yet another example for determining a new start symbol of a time domain resource in accordance with some embodiments of the present application.

FIG. 13 illustrates yet another example for determining a new start symbol of a time domain resource in accordance with some embodiments of the present application.

The embodiments of FIG. 13 have the same TDD configurations as those in FIGS. 8-12. Similar to FIG. 8, the TDD format of Slot 1 is also configured as 3D:3F:8U. The maximum number of consecutive UL symbols N of Slot 1 equals to 8. The embodiments of FIG. 13 assume that SLIV of the scheduling DCI determines L=6. According to Option 4, a UE considers that symbols for SRS or PUCCH transmission in the fifth and sixth UL symbols of Slot 1 in the time domain as unavailable symbols, and two available symbol sets "R1" and "R2" exist in Slot 1. The UE may select the first available symbol set "R1" with more symbols in a time domain as the available symbol set "R". The maximum number of consecutive UL symbols N of "R1" equals to 4. A difference between L and N is 2. A new start symbol S can be advanced two F symbols from the first UL symbol in the available symbol set "R1" as shown in FIG. 13. The new start symbol S is the second F symbol of Slot 1 in the time domain.

Figure 14:
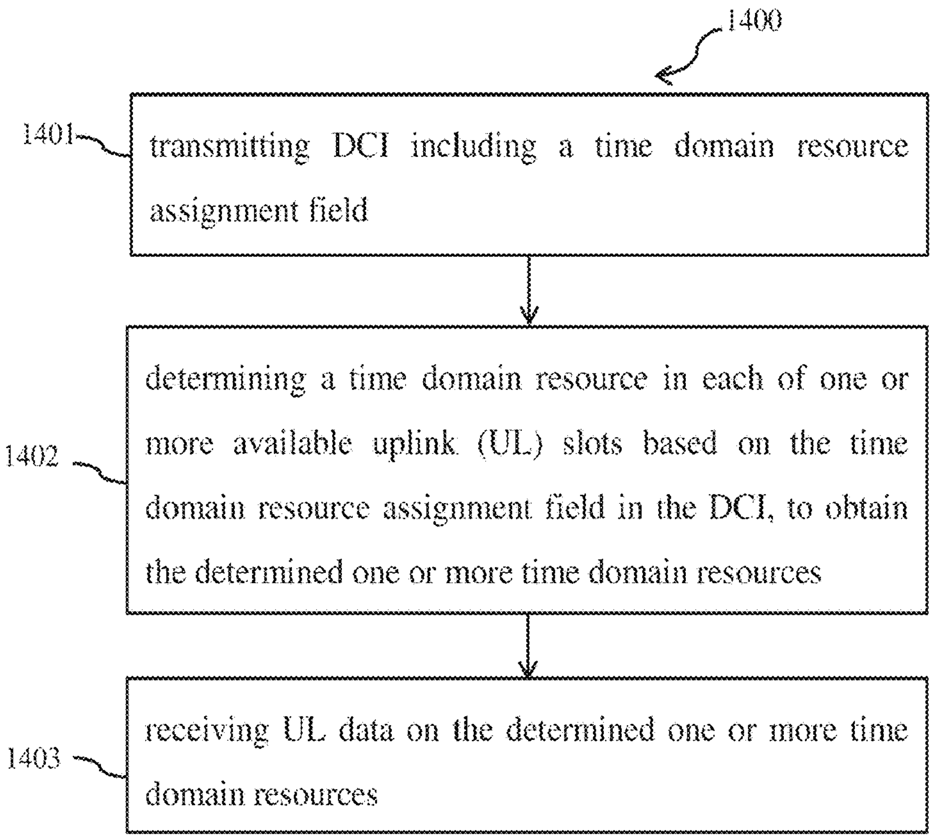
FIG. 14 illustrates a further flow chart of a method for determining a time domain resource in accordance with some embodiments of the present application.

FIG. 14 illustrates a further flow chart of a method for determining a time domain resource in accordance with some embodiments of the present application.

The exemplary method 1400 may be performed by a BS (e.g., BS 102 as shown and illustrated in any of FIG. 1). Although described with respect to a BS, it should be understood that other device(s) may be configured to perform the method as shown and illustrated in FIG. 14.

In the exemplary method 1400 as shown in FIG. 14, in operation 1401, a BS (e.g., BS 102 as shown and illustrated in FIG. 1) transmits DCI including a time domain resource assignment field. In operation 1402, the BS determines a time domain resource in each of one or more available uplink (UL) slots based on the time domain resource assignment field in the DCI, to obtain the determined one or more time domain resources. In operation 1403, the BS receives UL data on the determined one or more time domain resources. In one embodiment, the UL data includes a PUSCH repetition (e.g., a PUSCH repetition type A).

In some embodiments, the one or more available UL slots include a special type slot. The special type slot may include: one or more flexible symbols; or the one or more flexible symbols, and at least one of a downlink (DL) symbol and an UL symbol. In an embodiment, the special type slot includes one or more flexible symbols and one or more DL symbols. In a further embodiment, the special type slot includes one or more flexible symbols and one or more UL symbols. In another embodiment, the special type slot includes one or more flexible symbols, one or more DL symbols, and one or more UL symbols.

According to some embodiments, the special type slot includes a set of consecutive symbols in a time domain. In one example, the set of consecutive symbols may include at least one flexible symbol and at least one UL symbol. In a further example, the set of consecutive symbols may only include one or more flexible symbols. In another example, the set of consecutive symbols may only include one or more UL symbols.

In an embodiment, a maximum symbol total number of the set of consecutive symbols (e.g., which may be marked as "M") is larger than or equal to a sum of "a configured value" and "a value associated with receiving-transmission transition time". The value associated with receiving-transmission transition time is larger than or equal to 0. Specific embodiments are shown in FIGS. 5A, 5B, and 6-13.

If a receiving-transmission transition time, which may be marked as "Rx-Tx transition time", is needed, a gap between the determined new start symbol "S" and the first symbol of the available symbol set "R" cannot be smaller than a Rx-Tx transition time. If considering other factors, the gap between the determined start symbol "S" and the first symbol of "R" is smaller than a Rx-Tx transition time, the new start symbol "S" is determined by the first symbol in the available symbol set "R" and the Rx-Tx transition time.

In an example, the configured value is configured by radio resource control (RRC) signaling. In a further example, the configured value is derived from a start and length indicator value (SLIV). The SLIV may be determined based on the time domain resource assignment field in the DCI received in operation 401. In another example, the configured value is derived from an allocation length value (e.g., which may be marked as "L"). The allocation length value may be determined based on the time domain resource assignment field. For instance, the configured value may be computed as L multiplied by a scaling factor. Or, the configured value may be computed as equivalent to the value of L.

According to some embodiments, in operation 1402, during the BS determining the time domain resource, the BS determines one of following sets in a slot within the one or more available UL slots, as an available symbol set (e.g., which may be marked as "R"):

(1) a set of available symbols of a first occurrence in a time domain;

(2) a set of available symbols closest, in the time domain, to a starting symbol of the slot within the one or more available UL slots, wherein the starting symbol is determined based on the time domain resource assignment field;

(3) a set of available symbols not including a physical uplink control channel (PUCCH) resource or a SRS resource, if there are, in the time domain, the set of available symbols not including the PUCCH resource or the SRS resource and a set of available symbols including at least one of a PUCCH resource and a SRS resource; and (4) a set of available symbols including a least symbol total number of a PUCCH resource and a SRS resource, if there are, in the time domain, two or more sets of available symbols including at least one of a PUCCH resource and a SRS resource.

In some embodiment, a starting symbol of the time domain resource in each of the one or more available UL slots is determined by at least one of:

(1) A symbol of a first occurrence in a time domain within the available symbol set, i.e., the first symbol within the available symbol set in the time domain, which may also be named as an initial symbol within the available symbol set.

(2) A flexible symbol of a first occurrence in the time domain within the available symbol set, i.e., the first flexible symbol within the available symbol set in the time domain, which may also be named as an initial flexible symbol within the available symbol set.

(3) An UL symbol of a first occurrence in the time domain within the available symbol set, i.e., the first UL symbol within the available symbol set in the time domain, which may also be named as an initial UL symbol within the available symbol set.

(4) A difference between an allocation length value (i.e., "L") and a maximum symbol total number of consecutive UL symbols within the available symbol set (e.g., which may be marked as "N"). The allocation length value "L" may be determined based on the time domain resource assignment field. Specific embodiments are shown in FIGS. 10 and 11.

(5) A margin symbol in the time domain of the time domain resource. Specific embodiments are shown in FIGS. 8, 11, and 12.

For instance, the margin symbol in the time domain of the time domain resource may be determined by one of:

(1) RRC signaling;

(2) receiving-transmission transition time;

(3) a duration of one or more overlapping symbols in the available symbol set, wherein the one or more overlapping symbols carry at least one of a SRS resource and a PUCCH resource; and (4) a starting symbol of the one or more overlapping symbols, an UL symbol of a first occurrence in the time domain within the available symbol set, and the allocation length value.

Details described in all other embodiments of the present application (for example, details of a PUSCH repetition enhancement mechanism for TDD) are applicable for the embodiments of FIG. 14. Moreover, details described in the embodiments of FIG. 14 are applicable for all the embodiments of FIGS. 1-13 and 15.

Figure 15:
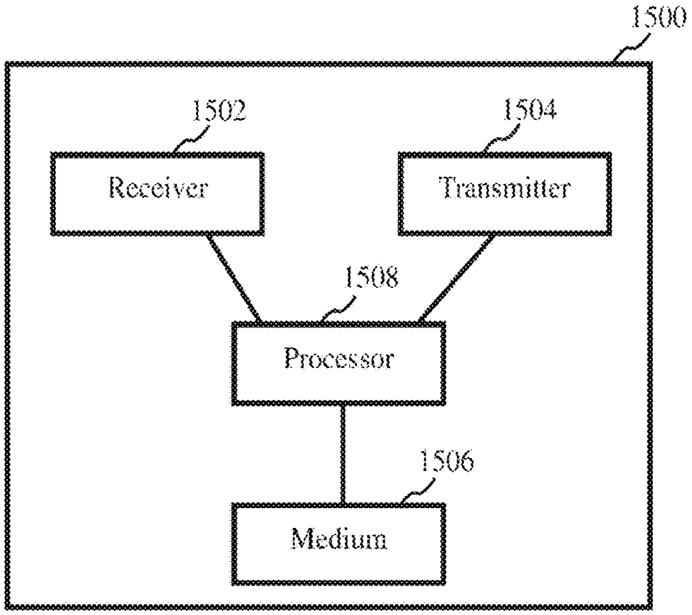
FIG. 15 illustrates a block diagram of an exemplary apparatus in accordance with some embodiments of the present application.

FIG. 15 illustrates a block diagram of an exemplary apparatus in accordance with some embodiments of the present application. Referring to FIG. 15, the apparatus 1500 includes a receiving circuitry 1502, a transmitting circuitry 1504, a processor 1506, and a non-transitory computer-readable medium 1508. The processor 1506 is coupled to the non-transitory computer-readable medium 1508, the receiving circuitry 1502, and the transmitting circuitry 1504.

It is contemplated that some components are omitted in FIG. 15 for simplicity. In some embodiments, the receiving circuitry 1502 and the transmitting circuitry 1504 may be integrated into a single component (e.g., a transceiver).

In some embodiments, the non-transitory computer-readable medium 1508 may have stored thereon computer-executable instructions to cause a processor to implement the operations with respect to UE(s) as described above. For example, upon execution of the computer-executable instructions stored in the non-transitory computer-readable medium 1508, the processor 1506 and the receiving circuitry 1502 performs the method of FIG. 6, including: the receiving circuitry 1502 receives CCE AL information in a search space set configuration; the processor 1506 determines a scaling factor for each of repetition levels of a maximum repetition number, wherein the maximum repetition number corresponds to a total number of MOs within a set of MOs; the processor 1506 computes a number of PDCCH candidates to be monitored for each of the repetition levels based on the CCE AL information and the scaling factor for each of the repetition levels, and the receiving circuitry 1502 receives a control signal on the PDCCH candidates.

The method of the present application can be implemented on a programmed processor. However, the controllers, flowcharts, and modules may also be implemented on a general purpose or special purpose computer, a programmed microprocessor or micro-controller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in random access memory (RAM) memory, flash memory, Read Only Memory (ROM), Erasable Programmable Read-Only memory (EPROM), Electrically Erasable Programmable read only memory (EEPROM), registers, a hard disk, a removable disk, a Compact Disc Read-Only Memory (CD-ROM), or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that comprises the element. Also, the term "another" is defined as at least a second or more. The terms "including", "having", and the like, as used herein, are defined as "comprising".

What is claimed is:

1. A user equipment (UE) for wireless communication, comprising:

at least one memory; and at least one processor coupled to the at least one memory, the at least one processor configured to cause the UE to:

receive downlink control information (DCI) including a time domain resource assignment field;

determine, based at least in part on the time domain resource assignment field, whether each uplink (UL) slot of a set of UL slots satisfies a condition associated with transmission of a physical uplink shared channel (PUSCH) transmission of a set of PUSCH transmissions, wherein:

the set of UL slots includes a special type slot including at least one downlink (DL) symbol, the special type slot includes a set of consecutive symbols in a time domain, the condition is that a maximum symbol total number of the set of consecutive symbols is greater than or equal to a sum of a configured value and a value associated with receiving-transmission transition time, and the value associated with receiving-transmission transition time is greater than 0;

select, based at least in part on the time domain resource assignment field, a respective one or more time domain resources from each UL slot of the set of UL slots that satisfies the condition; and transmit UL data via the selected respective one or more time domain resources in each UL slot of the set of UL slots that satisfies the condition, the UL data corresponding to the set of PUSCH transmissions.

2. The UE of claim 1, wherein the special type slot includes the at least one DL symbol and at least one of one or more flexible symbols or an UL symbol.

3. The UE of claim 1, wherein the set of consecutive symbols includes:

at least one flexible symbol and at least one UL symbol;

one or more flexible symbols; or one or more UL symbols.

4. The UE of claim 1, wherein the configured value is one or more of:

configured by radio resource control (RRC) signaling;

derived from a start and length indicator value (SLIV), wherein the SLIV is determined based on the time domain resource assignment field; or derived from an allocation length value, wherein the allocation length value is determined based on the time domain resource assignment field.

5. The UE of claim 1, wherein, to select the respective one or more time domain resources, the at least one processor is configured to cause the UE to select, in a slot within the set of UL slots, an available symbol set as one or more of:

a set of available symbols of a first occurrence in a time domain;

a set of available symbols closest, in the time domain, to a starting symbol of the slot within the set of UL slots, wherein the starting symbol is determined based on the time domain resource assignment field;

a set of available symbols not including a physical uplink control channel (PUCCH) resource or a sounding reference signal (SRS) resource, in response to an occurrence, in the time domain, of the set of available symbols not including the PUCCH resource or the SRS resource and a set of available symbols including at least one of a PUCCH resource and a SRS resource; or a set of available symbols including a least symbol total number of a PUCCH resource and a SRS resource, in response to an occurrence, in the time domain, of two or more sets of available symbols including at least one of a PUCCH resource and a SRS resource.

6. The UE of claim 5, wherein a starting symbol of the respective one or more time domain resources in each UL slot of the set of UL slots is determined by at least one of:

a symbol of a first occurrence in the time domain within the available symbol set;

a flexible symbol of a first occurrence in the time domain within the available symbol set;

an UL symbol of a first occurrence in the time domain within the available symbol set;

a difference between an allocation length value and a maximum symbol total number of consecutive UL symbols within the available symbol set, wherein the allocation length value is determined based on the time domain resource assignment field; or a margin symbol in the time domain of the respective one or more time domain resources.

7. The UE of claim 6, wherein the margin symbol is determined by at least one of:

radio resource control (RRC) signaling;

receiving-transmission transition time;

a duration of one or more overlapping symbols in the available symbol set, wherein the one or more overlapping symbols carry at least one of a SRS resource and a PUCCH resource; or a starting symbol of the one or more overlapping symbols, an UL symbol of a first occurrence in the time domain within the available symbol set, and the allocation length value.

8. A base station for wireless communication, comprising:

at least one memory; and at least one processor coupled to the at least one memory, the at least one processor configured to cause the base station to:

transmit downlink control information (DCI) including a time domain resource assignment field;

determine, based at least in part on the time domain resource assignment field, whether each uplink (UL) slot of a set of UL slots satisfies a condition associated with transmission of a physical uplink shared channel (PUSCH) transmission of a set of PUSCH transmissions, wherein:

the set of UL slots includes a special type slot including at least one downlink (DL) symbol, the special type slot includes a set of consecutive symbols in a time domain, the condition is that a maximum symbol total number of the set of consecutive symbols is greater than or equal to a sum of a configured value and a value associated with receiving-transmission transition time, and the value associated with receiving-transmission transition time is greater than 0;

select, based at least in part on the time domain resource assignment field, a respective one or more time domain resources from each UL slot of the set of UL slots that satisfies the condition; and receive UL data via the selected respective one or more time domain resources in each UL slot of the set of UL slots that satisfies the condition, the UL data corresponding to the set of PUSCH transmissions.

9. The base station of claim 8, wherein the special type slot includes the at least one DL symbol and at least one of one or more flexible symbols and an UL symbol.

10. The base station of claim 8, wherein the set of consecutive symbols includes at least one of:

at least one flexible symbol and at least one UL symbol;

one or more flexible symbols; or one or more UL symbols.

11. The base station of claim 8, wherein, to select the respective one or more time domain resources, the at least one processor is configured to cause the base station to select, in a slot within the set of UL slots, an available symbol set as one or more of:

a set of available symbols of a first occurrence in a time domain;

a set of available symbols closest, in the time domain, to a starting symbol of the slot within the set of UL slots, wherein the starting symbol is determined based on the time domain resource assignment field;

a set of available symbols not including a physical uplink control channel (PUCCH) resource or a sounding reference signal (SRS) resource, in response to an occurrence, in the time domain, of the set of available symbols not including the PUCCH resource or the SRS resource and a set of available symbols including at least one of a PUCCH resource and a SRS resource; or a set of available symbols including a least symbol total number of a PUCCH resource and a SRS resource, in response to an occurrence, in the time domain, of two or more sets of available symbols including at least one of a PUCCH resource and a SRS resource.

12. The base station of claim 11, wherein a starting symbol of the respective one or more time domain resources in each UL slot of the set of UL slots is determined by at least one of:

a symbol of a first occurrence in the time domain within the available symbol set;

a flexible symbol of a first occurrence in the time domain within the available symbol set;

an UL symbol of a first occurrence in the time domain within the available symbol set;

a difference between an allocation length value and a maximum symbol total number of consecutive UL symbols within the available symbol set, wherein the allocation length value is determined based on the time domain resource assignment field; or a margin symbol in the time domain of the respective one or more time domain resources.

13. A method performed by a user equipment (UE), the method comprising:

receiving downlink control information (DCI) including a time domain resource assignment field;

determining, based at least in part on the time domain resource assignment field, whether each uplink (UL) slot of a set of UL slots satisfies a condition associated with transmission of a physical uplink shared channel (PUSCH) transmission of a set of PUSCH transmissions, wherein:

the set of UL slots includes a special type slot including at least one downlink (DL) symbol, the special type slot includes a set of consecutive symbols in a time domain, the condition is that a maximum symbol total number of the set of consecutive symbols is greater than or equal to a sum of a configured value and a value associated with receiving-transmission transition time, and the value associated with receiving-transmission transition time is greater than 0;

selecting, based at least in part on the time domain resource assignment field, a respective one or more time domain resources from each UL slot of the set of UL slots that satisfies the condition; and transmitting UL data via the selected respective one or more time domain resources in each UL slot of the set of UL slots that satisfies the condition, the UL data corresponding to the set of PUSCH transmissions.

14. The method of claim 13, wherein the special type slot includes the at least one DL symbol and at least one of one or more flexible symbols or an UL symbol.

15. The method of claim 13, wherein the set of consecutive symbols includes at least one of:

at least one flexible symbol and at least one UL symbol;

one or more flexible symbols; or one or more UL symbols.

16. The method of claim 13, wherein the configured value comprises at least one of:

configured by radio resource control (RRC) signaling;

derived from a start and length indicator value (SLIV), wherein the SLIV is determined based on the time domain resource assignment field; or derived from an allocation length value, wherein the allocation length value is determined based on the time domain resource assignment field.

17. The method of claim 13, wherein selecting the respective one or more time domain resources further comprises selecting, in a slot within the set of UL slots, an available symbol set as at least one of:

a set of available symbols of a first occurrence in a time domain;

a set of available symbols closest, in the time domain, to a starting symbol of the slot within the set of UL slots, wherein the starting symbol is determined based on the time domain resource assignment field;

a set of available symbols not including a physical uplink control channel (PUCCH) resource or a sounding reference signal (SRS) resource, in response to an occurrence, in the time domain, of the set of available symbols not including the PUCCH resource or the SRS resource and a set of available symbols including at least one of a PUCCH resource and a SRS resource; or a set of available symbols including a least symbol total number of a PUCCH resource and a SRS resource, in response to an occurrence, in the time domain, of two or more sets of available symbols including at least one of a PUCCH resource and a SRS resource.

18. The UE of claim 1, wherein the configured value is equivalent to an allocation length value determined based at least in part on the time domain resource assignment field.

19. The UE of claim 1, wherein, in response to a UL slot of the set of UL slots not satisfying the condition, the at least one processor is configured to cause the UE to delay the PUSCH transmission corresponding to the UL slot to a next UL slot of the set of UL slots that satisfies the condition.

20. The UE of claim 1, wherein the special type slot further includes one or more flexible symbols and one or more UL symbols, and wherein the at least one DL symbol precedes the one or more flexible symbols and the one or more UL symbols in the time domain.

* * * * *